United States Patent [19]

Peters

[11] 4,031,559
[45] June 21, 1977

[54] FILTER CAPACITOR CHARGING CIRCUIT

[75] Inventor: Daniel Vern Peters, Naperville, Ill.

[73] Assignee: Bell Telephone Laboratories, Incorporated, Murray Hill, N.J.

[22] Filed: Dec. 10, 1975

[21] Appl. No.: 639,396

[52] U.S. Cl. .................................... 361/52; 320/1; 361/86
[51] Int. Cl.[2] ........................................ H02H 9/04
[58] Field of Search ................. 317/16, 20, 31, 50; 320/1; 321/11, 14; 323/96, 97

[56] References Cited

UNITED STATES PATENTS

| | | | |
|---|---|---|---|
| 3,412,208 | 11/1968 | Jacob | 179/15 |
| 3,549,851 | 12/1970 | Hockenberry et al. | 320/1 X |
| 3,555,361 | 1/1971 | Hallberg | 317/20 |
| 3,748,534 | 7/1973 | Jones | 317/12 B |
| 3,935,511 | 1/1976 | Boulanger et al. | 317/20 |
| 3,935,527 | 1/1976 | Michelet et al. | 317/20 X |

Primary Examiner—Harry E. Moose, Jr.
Attorney, Agent, or Firm—John C. Albrecht

[57] ABSTRACT

A circuit is disclosed for charging an input filter capacitance from a source of potential before a protective circuit, e.g., a fuse, is established between the source of potential and the capacitance. If the charging circuit is connected between the potential source and the substantially discharged capacitance, a small charging current will flow through a current limiting resistance. This small current will partially charge the capacitance if no faults are present. A threshold detector circuit monitors the voltage on the capacitance and for a voltage of approximately three volts or more, in the case of a twenty-four volt potential source, activates a charging transistor. The charging transistor is controlled by feedback circuitry to provide a larger but limited charging current to complete the charging to within approximately one volt of the potential of the source of potential.

6 Claims, 4 Drawing Figures

FILTER CAPACITOR CHARGING CIRCUIT

FIELD OF THE INVENTION

My invention relates to circuits for charging a power input filter capacitance.

BACKGROUND OF THE INVENTION

A problem arises in the initialization of apparatus which includes a large input filter capacitance and in the replacement of fuses serving such circuitry due to the large inrush of current to charge the filter capacitance. Such large inrush currents create undesirable variations in the supply voltage and the possibilities of blowing fuses or opening circuit breakers and excessively eroding fuse holders.

In the past these problems have been attacked by utilization of a resistance or the series combination of a resistance and an inductance in the charging path of the capacitance. A prior art arrangement comprises a series combination of a resistance and a switch connected across a fuse holder. The fuse holder is connected between a source of potential and apparatus having an input filter capacitance to be charged. The switch is manually closed such that current will initially flow through the resistance to the apparatus. This current will charge the capacitor to a voltage level which depends on the current drawn by the apparatus and the resistance used. After the capacitance has been thus partially charged, a fuse is inserted into the fuse holder and the switch is manually opened.

A problem in the prior art arises in the selection of a resistance. If a resistance is selected to significantly reduce the power supply voltage variations, the capacitance will not be charged to a sufficiently large voltage to insure not blowing a fuse. If a resistance is selected to charge the capacitance to a voltage level which will insure not blowing a fuse, the inrush current will be sufficiently large to induce significant power supply voltage variations. Thus a compromise must be made.

SUMMARY OF THE INVENTION

In accordance with my invention, a circuit for charging an input filter capacitance comprises circuitry for applying a first charging current to the capacitance, circuitry for sensing the voltage across the capacitance, and circuitry for charging the capacitance at a larger but limited current in response to the sensing circuitry sensing a voltage of at least a specified value on the capacitance. If the charging circuit is connected between a source of potential and a discharged capacitance, initially a limited current will flow, and, if no faults are present on the circuit connected to the charging circuit, the capacitance will be partially charged by this limited current. After the voltage across the capacitance reaches a predetermined value, the sensing circuit generates a signal to activate a charging circuit which completes the charging of the capacitance at a larger but limited current.

Advantageously, this charging circuit can be utilized to charge an input filter capacitance with a current which is slightly larger than that required by the apparatus which incorporates the capacitance, and yet small enough to avoid major voltage variations. The circuit can charge the capacitance to within approximately one volt of the supply voltage so that the possibility of blowing fuses, tripping circuit breakers, or excessively eroding fuse holders is eliminated.

BRIEF DESCRIPTION OF THE DRAWING

The invention will be understood from the following detailed description when read with reference to the drawing in which.

DETAILED DESCRIPTION

Figure 1:
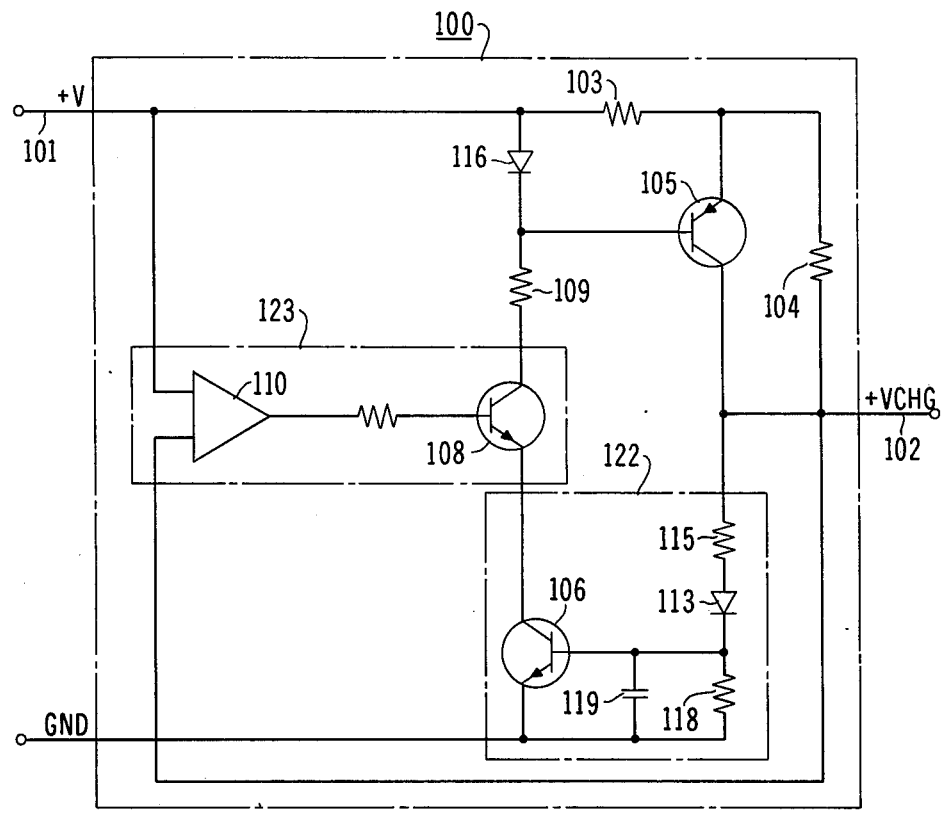
FIG. 1 is a first embodiment of my invention adapted to charge an input filter capacitance from a positive source of potential.

One embodiment of a capacitor charging circuit in accordance with my invention is shown in FIG. 1. This circuit is adapted to charge a capacitance from a positive source of potential. The circuit arrangement of FIG. 1 comprises an initial charging path comprising the resistors 103 and 104 and a subsequent charging path comprising the resistor 103 and the transfer 105 which is activated under the control of the voltage sensing circuit 122 and the power conservation circuit 123. If the input terminal 101 is connected to a positive source of potential and the output terminal 102 is connected to a circuit having a discharged power input capacitance, initially a limited charging current will flow through the resistors 103 and 104. The transistor 105 is initially held in its nonconducting state by the voltage sensing circuit 122 to protect the transistor 105 from possible damage due to faults which may be present in the circuit connected to the output terminal 102. The transistor 105 is activated by the voltage sensing circuit 122 if the capacitance charges properly.

The transistor 105 is controlled by the transistor 108 which is included in the power conservation circuit 123. In the absence of current flow through the resistors 103 and 104 or through the resistor 103 and the transistor 105 the potential at the input terminal 101 and the potential at the output terminal 102 will be identical and the output of the comparator circuit 110 is such that the transistor 108 is nonconducting. As soon as current flows in either the resistors 103 and 104 or in the resistor 103 and the transistor 105 the potential at the output terminal 102 will drop and the comparator circuit 110 will provide an output signal which causes the transistor 108 to become conductive thus coupling the output of the voltage sensing circuit 122 to the base emitter circuit of the transistor 105. The power conservation circuit 123 eliminates the power consumed in the resistor 109 if the charging circuit 100 remains connected to the source of potential when idle.

The capacitance is partially charged by the current through resistors 103 and 104 to a voltage which is sufficient to forward bias the diode device 113 and the base emitter junction of the transistor 106. With the voltage on the capacitance at or above this level, base current is provided to the transistor 106 and it becomes conductive. The resistor 115 limits the base current to the transistor 106. The conductive transistors 106 and 108 provide base current limited by the resistor 109 to the transistor 105. The current flow through the transistor 105 is limited by the diode device 116 which shunts a portion of the available base current from the transistor 105 if the voltage across the resistor 103 should exceed the voltage drop across the forward biased diode device 116 minus the voltage drop of the base emitter junction of the transistor 105. Accordingly, the charging current which flows through the transistor 105 can be set by selection of the resistor 103 and the diode device 116.

The resistor 118 serves as a base emitter bypass for the transistor 106 and the capacitance 119 prevents amplifier oscillation.

Figure 2:
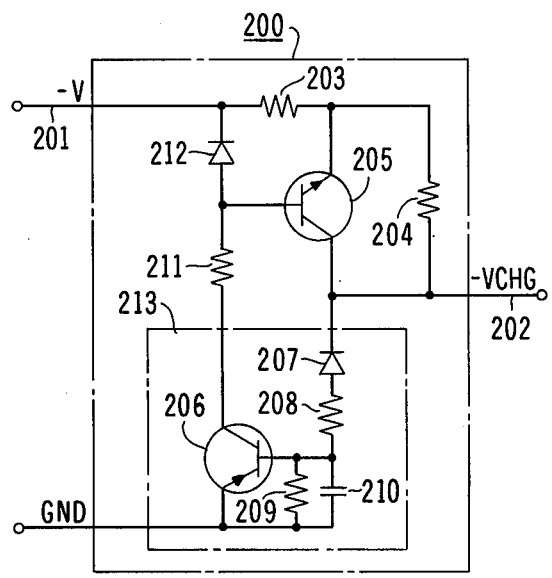
FIG. 2 is a second embodiment of my invention adapted to charge an input filter capacitance from a negative source of potential.

FIG. 2 shows a second embodiment of my invention which is adapted to charge a capacitance from a negative source of potential. Operation of this circuit closely parallels operation of the circuit of FIG. 1. The circuit arrangement of FIG. 2 comprises an initial charging path comprising resistors 203 and 204 and a subsequent charging path comprising the resistor 203 and the transistor 205 which is activated under the control of the voltage sensing circuit 213. If the input terminal 201 is connected to a negative source of potential and the output terminal 202 is connected to a circuit which includes a discharged power input capacitance, initially a limited charging current will flow through the resistors 203 and 204. The transistor 205 is initially held in its nonconducting state by the voltage sensing circuit 213 to protect the transistor 205 from possible damage due to faults which may be present in the circuit connected to the output terminal 202.

The circuit of FIG. 2 operates at lower currents than the circuit of FIG. 1 and therefore a power conservation circuit (comparable to the power conservation circuit 123 in FIG. 1) is not utilized.

The capacitance in the circuit connected to the terminal 202 is partially charged by the limited current through the resistors 203 and 204 to a voltage which is sufficient to forward bias the diode device 207 and the emitter base junction of the transistor 206. If the voltage on the capacitance is at least of this value, base current limited by the resistor 208 flows to and activates the transistor 206. The resistor 209 serves as a base emitter bypass and the capacitance 210 prevents amplifier oscillation. The transistor 206 provides base current limited by the resistor 211 to the transistor 205 and it becomes conductive. The current flow through the transistor 205 is limited by the diode device 212 which shunts base drive from the transistor 205 if the voltage across the resistor 203 exceeds the forward biased voltage drop of the diode device 212 minus the base emitter voltage drop of the transistor 205. Accordingly, the charging current which flows through the transistor 205 can be set by the selection of the diode device 212 and the resistance value of the resistor 203.

Figure 3:
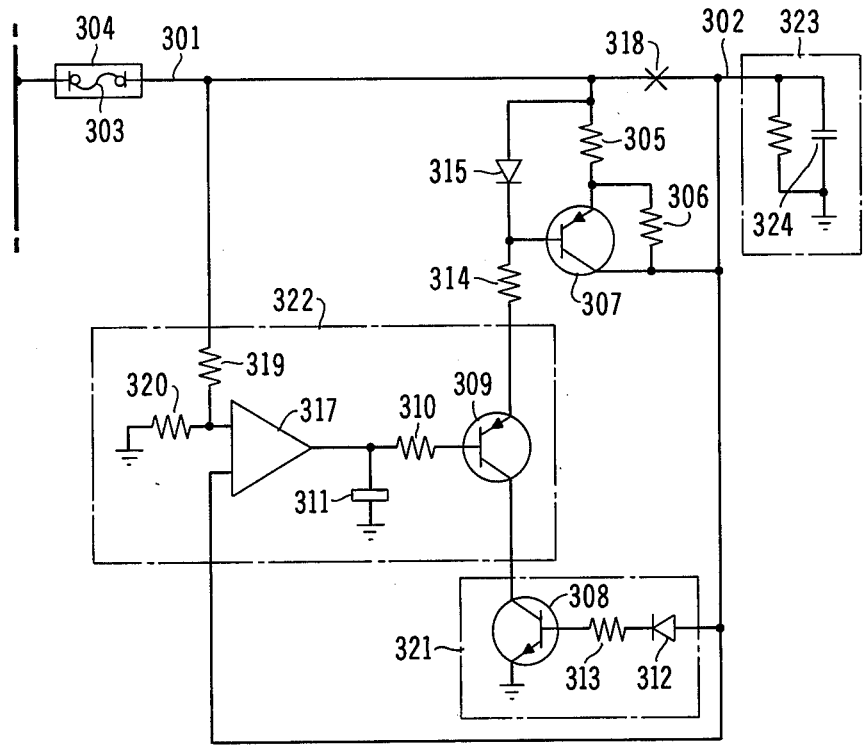
FIG. 3 is a third embodiment of my invention which charges a capacitance upon fuse insertion and, after the capacitance is substantially charged, bypasses the charging circuit with a hard metallic path.

The embodiment of FIG. 3 charges a circuit power input capacitance upon fuse insertion. The circuit of FIG. 3 is hard wired between the fuse holder 304 and the circuit to be served, 323, and comprises an initial charging path comprising the resistors 305 and 306 and a subsequent charging path comprising the resistor 305 and the transistor 307 which is activated under the control of voltage sensing circuit 321 and the power conservation and bypass circuit 322. If the fuse 303 is inserted into the fuse holder 304 with the capacitance 324 discharged, initially a limited current flows through the resistors 305 and 306. The transistor 307 is initially held in its nonconducting state by the transistor 308 to protect the transistor 307 from possible damage due to faults which may be present in the circuit to be served, 323. Transistor 309 is held in its conductive state and the relay 311 is held released by the output of the comparator 317 whose operation is explained below.

If no faults are present in the circuit to be served 323, the capacitance 324 is partially charged by the current through the resistors 305 and 306 to a voltage which is sufficient to forward bias the diode device 312 and the base emitter junction of the transistor 308. With the voltage on the capacitance at or above this level, base current limited by the resistor 313 will flow to the transistor 308. This base current activates the transistor 308 which provides base current limited by the resistor 314 to the transistor 307. The current flow through the transistor 307 substantially completes the charging of the capacitance 324. This current is limited by the diode device 315 and the resistor 305.

Figure 4:
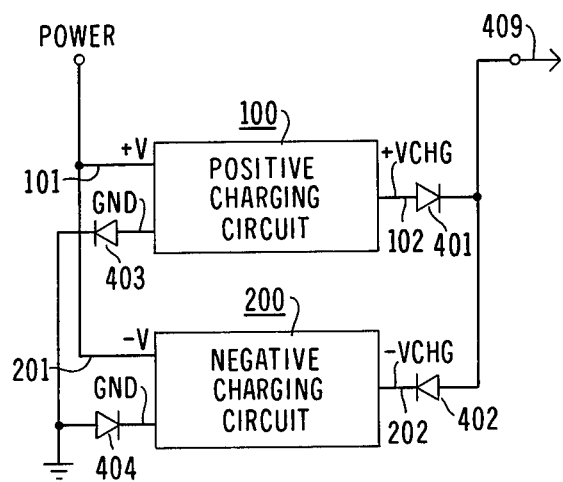
FIG. 4 is a fourth embodiment of my invention whereby a capacitance is charged by either a positive or a negative source of potential, the circuit automatically adapting to the polarity of the attached source of potential.

The comparator 317 compares the voltage on the output terminal 302 to a reference voltage generated by the voltage divider comprising the resistors 319 and 320. Until the capacitance 324 is substantially charged, the potential at the output terminal 302 is below the reference potential and the output of the comparator is near ground holding the relay 311 released and the transistor 309 in conduction by providing base drive limited by the resistor 310. Once the capacitance 324 is substantially charged, the potential on the output terminal 302 exceeds the reference potential and the output of the comparator goes high forcing the transistor 309 into its nonconducting state and operating the relay 311. The contact 318 of the relay 311 closes a metallic path between the input terminal 301 and the output terminal 302 which bypasses the charging circuit and insures that the output of the comparator will remain high until the input power is interrupted. Thus, the power conservation and bypass circuit 322 conserves power by removing the base drive from the transistor 307 and removes the charging circuit from the power feeder after the capacitance 324 is substantially charged.

Where the arrangement of FIG. 3 is not convenient or is not practical, a portable unit utilizing my invention is possible. The circuits of FIG. 1 and FIG. 2 may be utilized individually to charge a capacitance from either a positive or a negative source of potential respectively, but not both. The embodiment of FIG. 4 combines these circuits to provide for charging a capacitance from either a positive or a negative source of potential. This combination circuit automatically adapts to the polarity of the source of potential to which it is connected.

The output plug 409 is plugged into a fuse holder to charge the associated capacitance as described with reference to FIG. 1 and FIG. 2. A doubly fused system is ideal but not necessary. In a doubly fused system a first primary fuse is paralleled by a second indicating fuse and the primary fuse can be inserted while the portable charging circuit is still connected via the indicating fuse holder.

The ability to adapt to the polarity of a connected source of potential is provided by the four diodes 401 through 404. Power of either polarity is connected to both circuits and ground is connected to the junction of the diodes 403 and 404. The output plug 409 is connected to the junction of the diodes 401 and 402. If a negative source of potential is connected to the circuit, the diodes 402 and 404 allow current to flow to the negative charging circuit 200 which operates as previously described with reference to FIG. 2. The diodes 401 and 403 prevent current flow to the positive charging circuit 100 and serve to isolate the positive charging circuit 100 from the negative charging circuit 200.

If a positive source of potential is connected to the circuit, the diodes 401 and 403 allow current to flow to the positive charging circuit 100 which operates as previously described with reference to FIG. 1. The diodes 402 and 404 prevent current flow to the negative charging circuit 200 and serve to isolate the negative charging circuit 200 from the positive charging circuit 100.

What is claimed is:

1. A circuit for charging an input filter capacitance from a source of potential having a battery terminal and a ground terminal comprising:
   an input connected to the battery terminal, and an output for connection to the capacitance;
   a first charging circuit comprising two resistors connected in series between said input and said output;
   a threshold detecting circuit comprising first semiconductor switching means connected to said ground terminal and having an output terminal and a control terminal, and diode means connected between said output and said control terminal of said first semiconductor switching means;
   a second charging circuit comprising second semiconductor switching means connected between the junction of said two resistors and said output and having a control terminal, and diode means interconnecting said battery terminal and said control terminal of said second semiconductor switching means; and
   means for coupling said output terminal to said control terminal of said second semiconductor switching means.

2. A circuit in accordance with claim 1 further comprising:
   a comparator circuit connected between said input and said output to generate a control signal to control said coupling means which comprises semiconductor switching means.

3. A circuit in accordance with claim 2 further comprising a relay responsive to said control signal to connect said input to said output.

4. A circuit for charging an input filter capacitance comprising:
   a source of potential having a battery terminal and a ground terminal;
   an input connected to said battery terminal, and an output;
   a first resistor and a second resistor connected in series between said input and said output;
   a first transistor of one conductivity type having a base, an emitter, and a collector, said emitter connected to the junction of said first and second resistors and said collector connected to said output;
   first diode means coupling said battery terminal to said base;
   a second transistor of the opposite conductivity type having a base, an emitter and a collector, said emitter of said second transistor connected to said ground terminal;
   a series combination of a third resistor and second diode means connecting said output to said base of said second transistor;
   means for connecting said base of said first transistor to said collector of said second transistor; and
   a parallel combination of a fifth resistor and a capacitor connecting said base of said second transistor to said ground terminal.

5. A circuit for charging an input filter capacitance in accordance with claim 4 further comprising:
   a comparator circuit having two input terminals and an output terminal, one of said input terminals connected to said input and the other of said input terminals connected to said output;
   said connecting means comprising a third transistor of the opposite conductivity type and having a base, an emitter and a collector; and a fourth resistor connected between the base of said first transistor and said collector of said third transistor; said emitter of said third transistor connected to said collector of said second transistor; and
   a fifth resistor connected between said comparator circuit output and said base of said third transistor.

6. A circuit for charging an input filter capacitance comprising:
   a source of potential having a battery terminal and a ground terminal;
   an input connected to said battery terminal, and an output;
   a first resistor and a second resistor connected in series between said input and said output;
   a first transistor of one conductivity type having a base, an emitter, and a collector, the emitter of said first transistor connected to the junction of said first and second resistors and the collector of said first transistor connected to said output;
   first diode means coupling said input to the base of said first transistor;
   a second transistor of the opposite conductivity type having a base, an emitter, and a collector, the emitter of said second transistor connected to said ground terminal;
   a series combination of a third resistor and second diode means connecting said output to the base of said second transistor;
   a third transistor of the same conductivity type as said first transistor and having a base, an emitter, and a collector, the emitter of said third transistor connected to the collector of said second transistor;
   a fourth resistor connected between the base of said first transistor and the collector of said third transistor;
   a comparator circuit having two input terminals and an output terminal, one of said input terminals connected to said input and the other of said input terminals connected to said output;
   a fifth resistor connected between said output terminal of said comparator circuit and the base of said third transistor; and
   a relay for bypassing the capacitance charging circuitry and comprising an operating coil connected between said output terminal of said comparator circuit and said ground terminal, and a contact connected between said input and said output.

* * * * *